United States Patent
Meinekat (10) Patent No.: US 11,677,299 B2
(45) Date of Patent: Jun. 13, 2023

(54) EXTERNAL TEMPERATURE SENSOR ASSEMBLY

(71) Applicant: VESTAS WIND SYSTEMS A/S, Aarhus N (DK)

(72) Inventor: Ulrich Meinekat, Eutin (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 197 days.

(21) Appl. No.: 17/014,354

(22) Filed: Sep. 8, 2020

(65) Prior Publication Data

US 2021/0075300 A1 Mar. 11, 2021

(30) Foreign Application Priority Data

Sep. 6, 2019 (DK) .......................... PA 2019 70556

(51) Int. Cl.
*H02K 11/25* (2016.01)
*H02K 1/20* (2006.01)
*H02K 3/24* (2006.01)
*F03D 9/25* (2016.01)

(52) U.S. Cl.
CPC ............. *H02K 11/25* (2016.01); *H02K 1/20* (2013.01); *H02K 3/24* (2013.01); *F03D 9/25* (2016.05)

(58) Field of Classification Search
CPC ........ F03D 7/0272; F03D 80/60; F03D 7/042; F03D 9/25; F03D 9/11; H02K 11/25; H02K 5/22; H02K 1/20; H02K 3/24; H02P 9/007; H02P 29/664
See application file for complete search history.

(56) References Cited

U.S. PATENT DOCUMENTS

| 10,833,564 | B2* | 11/2020 | Dunn | H02K 5/00 |
| 11,223,258 | B2* | 1/2022 | Fuchs | H02K 3/50 |
| 2017/0373565 | A1 | 12/2017 | Wist et al. | |
| 2018/0323737 | A1 | 11/2018 | Masillamani | |

FOREIGN PATENT DOCUMENTS

| CN | 105141073 A | 12/2015 |
| DE | 102010030968 A1 | 1/2012 |
| DE | 102013201834 A1 | 8/2014 |

(Continued)

OTHER PUBLICATIONS

European Search Report for Application No. 20194000.4-1202/3790174 dated Oct. 2, 2021.

(Continued)

*Primary Examiner* — Leda T Pham
(74) *Attorney, Agent, or Firm* — Patterson + Sheridan, LLP (57) ABSTRACT

Embodiments herein provide an electrical machine comprising a stator with a stator winding arrangement, a rotor arranged for rotation inside the stator, a machine housing for housing the stator, at least one temperature sensor arrangement and wherein a sensor-end of the temperature sensor is arranged for insertion into the immersion sleeve and for insertion through an insertion bore arranged in an opening in the machine housing, so that the sensor-end of the temperature sensor is positioned within a cooling slot of the stator windings, when inserted, so as to allow sensing of a temperature of measure of temperature of the stator windings by electric connection to the wire-end of the temperature sensor.

13 Claims, 7 Drawing Sheets

(56) References Cited

FOREIGN PATENT DOCUMENTS

| | | | |
|---|---|---|---|
| DE | 102014215916 A1 | 2/2016 | |
| DE | 102015106377 A1 | 10/2016 | |
| DE | 102016213866 A1 | 2/2018 | |
| EP | 0993099 A1 * | 4/2000 | ............ H02K 11/25 |
| EP | 0993099 A1 | 4/2000 | |
| EP | 3182564 A1 * | 6/2017 | ............... G01K 7/22 |
| EP | 3182564 A1 | 6/2017 | |
| JP | 2004297958 A | 10/2004 | |
| WO | 2009003478 A2 | 1/2009 | |
| WO | WO-2009003478 A2 * | 1/2009 | ........... F03D 7/0272 |

OTHER PUBLICATIONS

Danish Patent and Trademark Office 1st Technical Examination for Application No. PA 20019 70556 dated Feb. 11, 2020.

* cited by examiner

EXTERNAL TEMPERATURE SENSOR ASSEMBLY

FIELD OF THE INVENTION

The present invention relates to the field of external temperature sensor assembly, more specifically to the field of temperature sensing within an electrical machine e.g. an electrical generator of a wind turbine. The invention provides a method and a device for mounting a temperature sensing arrangement for monitoring of a stator winding temperature in an electrical machine from the outside of a machine housing comprising an electrical generator.

BACKGROUND

For e.g. high power rotating electric machinery, such as motors or generators, sensing of temperature of stator windings is important for safe operation. Within the area of temperature sensor assemblies, it is a known problem that temperature sensors inside an electric machine with time show sign of not being fully functional or even broken. When a temperature sensor inside the machine potentially stops functioning, it is not possible to repair or replace the sensor. One solution is to install a number of temperature sensors at the same place for sensing the same temperature spot within the stator of the electrical machine. The need to have as minimum two sensors at the same spot several different places within the electrical machine, makes the cost unnecessarily high, the temperature sensors take more place, and it necessitates extra external equipment, such as electric cables and monitoring boxes for receiving the data from the temperature sensors, thereby also an unnecessarily extra cost and use of space for such equipment.

However, an improved method and assembly for sensing temperature inside an electrical machine and potentially repair or replace the temperature sensors from the outside of the electrical machine housing would be advantageous, and in particular, a more efficient, reliable and low-cost temperature sensor system would be advantageous.

OBJECT OF THE INVENTION

In particular, it may be seen as an object of the present invention to provide an improved method and assembly for sensing temperature inside an electrical machine and potentially repair or replace the temperature sensors from the outside of the electrical machine housing that may yield the mentioned advantages with respect to prior art temperature sensing methods and assemblies, such as being more reliable, efficient and/or low-cost.

It is a further object of the present invention to provide an alternative to the prior art.

SUMMARY

Thus, the above described object and several other objects are intended to be obtained in a first aspect of the invention by providing an electrical machine comprising;
- a stator with a stator winding arrangement comprising stator windings with cooling slots,
- a rotor arranged for rotation inside the stator,
- a machine housing for housing the stator,
- at least one temperature sensor arrangement comprising:
    - a temperature sensor with a sensor-end and a wire-end, and
    - an immersion sleeve, wherein an insertion angle of the temperature sensor arrangement through the machine housing (MH) is perpendicular to or approximately perpendicular to an axis of rotation of the rotor (RO), and wherein the sensor-end of the temperature sensor is arranged for insertion into the immersion sleeve and for insertion through an insertion bore arranged in an opening in the machine housing, so that the sensor-end of the temperature sensor is positioned within a cooling slot of the stator windings, when inserted, so as to allow sensing of a temperature of measure of temperature of the stator windings by electric connection to the wire-end of the temperature sensor.

The invention may be particularly, but not exclusively, advantageous for obtaining a more efficient and optimal system, as the temperature sensors placed within an electrical machine is now accessible from the outside of the machine housing, as the sensors is inserted through an insertion bore and thereby no longer inaccessible and hidden inside the machine, but very easily to access if needed.

Furthermore, the invention may also be particularly, but not exclusively, advantageous for obtaining a more reliable system, as the accessibility of the temperature sensors makes it possible to repair or replaced the sensors if any of the sensors shows any signs for not being functional. The sensors can without any trouble and without any specific tools be taken out of the electrical machine and thereby being fixed from the outside of the machine housing. This eliminates the need for mounting extra temperature sensors inside the machine, and thus the extra sensor itself can be eliminated as well as the need for extra cables and further equipment such as monitoring boxes for connecting the temperature sensors.

In an embodiment an electrical machine is provided, comprising an external terminal monitoring box connectable at the wire-end of the temperature sensor, so as to allow an electric communication between the temperature sensor and the external monitoring box, and so as to allow monitoring of the temperature inside the stator windings from the outside of the machine housing.

The invention may be particularly, but not exclusively, advantageous for obtaining a reliable system, as the temperature sensed inside the electrical machine in a very easy and simple way is communicated to the outside of the housing, so as the temperature is easily controllable for the person, who monitor the internal temperature of the electrical machine.

In an embodiment there is provided electrical machine, wherein the at least one temperature sensor arrangement is arranged for the temperature sensor being replaced from the outside of the machine housing.

The invention may be particularly, but not exclusively, advantageous for obtaining a low-cost, as the temperature sensors with this invention can potentially be repaired if they show any signs of not being functional. The repair can be performed outside the generator housing. If the sensor can not be repaired, a new temperature sensor can be inserted instead through the same insertion bore without any specific tools.

Furthermore, the invention may be particularly, but not exclusively, advantageous for obtaining a low-cost temperature sensing system, as the temperature sensors are accessible. The system used today, force a need of installing two temperature sensors for any spot inside the stator where temperature sensing is needed. If one of the sensors are not functional, the other will take over the temperature sensing. The need of having a double temperature sensing arrangement makes the installation cost at least double as high, as when only one temperature sensor per spot is needed.

Furthermore, the invention may be particularly, but not exclusively, advantageous for obtaining a more space-optimal temperature sensing arrangement, as the space needed for one temperature sensor is less than the space needed for two. This means that important space for extra cables and monitoring boxes etc. can be saved in the tight space of the nacelle of a wind turbine.

In an embodiment an electrical machine is provided, the electrical machine comprising a plurality of temperature sensor arrangements arranged for insertion into respective openings of the machine housing.

The invention may be particularly, but not exclusively, advantageous for obtaining a very easy accessibility to the temperature sensors. The sensors thereby being able to be repaired or replaced if they show signs for not being functional or broken.

Furthermore, the invention may be particularly, but not exclusively, advantageous for obtaining a very reliable temperature sensing system, as not only one spot inside the electrical machine is temperature sensed, but several different spots inside the electrical machine potentially can be sensed and controlled.

Furthermore, the invention may be particularly, but not exclusively, advantageous for obtaining a choice of how many spots inside the electrical machine that is optimal for being temperature sensed and thereby making a reliable system.

In an embodiment an electrical machine is provided, wherein a plurality of temperature sensors or respective temperature sensor arrangements are connected to one single external terminal monitoring box. Thus, several positions inside the stator can be covered by means of one single external terminal monitoring box.

The invention may be particularly, but not exclusively, advantageous for obtaining a low-cost temperature sensing system, as the present system of sensing temperatures inside an electrical machine has a need of double set of temperature sensors. The double set of temperature sensors makes a need of also having a double up of external monitoring boxes. E.g. there may be a need of minimum two external monitoring boxes to monitor the temperature sensed inside the electrical machine at three different positions, thus using six temperature sensors. This invention eliminates the need of double temperature sensor arrangement and thereby also eliminate the need of two monitoring boxes. Now only a single external monitoring is necessary to monitor all the sensed temperature spots inside the machine and thereby the cost will decrease.

In an embodiment there is provided an electrical machine, wherein the at least one temperature sensor arrangement is length extended. This may be done by the use of at least one bearing sensor. Especially, the length is extended to provide a distance of such as at least 10 cm between the senor-end and the wire-end of the temperature sensor. This allow the use of a small sensor, and still allow the sensor to be inserted into the immersion sleeve.

The invention may be particularly, but not exclusively, advantageous for obtaining a more conformable temperature sensing system as the length of the temperature sensors are variable and can with the bearing sensors being length extended so as they fit exactly with the system it is installed in.

In an embodiment there is provided an electrical machine, wherein the at least one temperature sensor is a resistance temperature detector type sensor.

The invention may be particularly, but not exclusively, advantageous for obtaining a reliable system. The resistance temperature detector type sensor is in the present temperature sensing system very functional and reliable. Therefore, the possibility of using the resistance temperature detector type sensor within the new system, makes the invention even more reliable. For example, a sensor type as the well-known pt 100 may be used.

In an embodiment, an electrical machine is provided, wherein the immersion sleeve is made of a polymeric material.

The invention may be particularly, but not exclusively, advantageous for obtaining a very durable and lasting system. Polymeric material has extremely great lifetime, as it is very rugged.

Furthermore, the invention may be particularly, but not exclusively, advantageous for obtaining an easy production of the immersion sleeve. The material is easy to form in any given shape. Therefor the polymeric material makes it possible to change the shape of the immersion sleeve, if needed.

In an embodiment there is provided an electrical machine, wherein the immersion sleeve is glued into the opening of the machine housing.

The invention may be particularly, but not exclusively, advantageous for obtaining an easy installation of the immersion sleeve and furthermore an easy replacement, as there is no need for any specific tools.

In an embodiment, an electrical machine is provided, wherein the insertion angle of the temperature sensor arrangement through the machine housing is perpendicular to or approximately perpendicular to an axis of rotation of the rotor.

In an embodiment the stator has radial cooling slots between stacks of lamination sheets, and wherein the temperature sensor has a length, so as to allow the sensor-end to be positioned at a bottom part of the cooling slot, while the wire-end is positioned outside the machine housing. By 'bottom part of the cooling slot' is understood the part of the cooling slot near the center of the machine, i.e. the 20% part of the total length of the cooling slot nearest the center of the machine. Preferably, an end of the cooling slot nearest the center of the machine is blocked by a suitable material, so as to prevent the sensor-end to be cooled by cooling fluid, when positioned in the bottom part of the cooling slot The invention may be particularly, but not exclusively, advantageous for obtaining an easy conformable installation inside the insertion bore, as the insertion length can be made in any wanted dimensions, fitting to the temperature sensing system.

In an embodiment there is provided an electrical machine, wherein the insertion opening of the machine housing is an insertion bore, wherein a bushing is inserted, the insertion bore having a diameter between 1 mm and 30 mm.

The invention may be particularly, but not exclusively, advantageous for obtaining an easily installation of the inside of the insertion bore, as a bushing is easily to install, replace and exchange if necessary.

Furthermore, the invention may be particularly, but not exclusively, advantageous for obtaining an easy conformable installation inside the insertion bore, as the insertion bore potentially can be made in any wanted dimensions and shapes, e.g. circular, rectangular or any other shape, fitting to the inserted device, the device preferably being a bushing.

In an embodiment an electrical is provided, wherein the electrical machine is an electrical generator. Especially, the generator may be capable of producing an electric power of at least 1 MW, such as 2 MW, such as 3 MW, such as 4 MW, such as 5 MW, such as 10 MW, or more.

In a second aspect, there is provided a wind turbine comprising an electrical generator, the generator comprising;
- a stator with a stator winding arrangement comprising stator windings with cooling slots,
- a rotor arranged for rotation inside the stator,
- a generator housing for housing the stator,
- at least one temperature sensor arrangement comprising:
  - a temperature sensor with a sensor-end and a wire-end, and
  - an immersion sleeve,
- wherein an insertion angle of the temperature sensor is arranged for insertion through the machine housing (MH) is perpendicular to or approximately perpendicular to an axis of rotation of the rotor (RO), and
- wherein the sensor-end of the temperature sensor is arranged for insertion into the immersion sleeve and for insertion through an insertion bore arranged in an opening in the generator housing, so that the sensor-end of the temperature sensor is positioned within a cooling slot of the stator windings, when inserted, so as to allow sensing of a temperature of measure of temperature of the stator windings by electric connection to the wire-end of the temperature sensor.

In a third aspect, the invention relates to use of an assembly for sensing temperature inside an electrical machine and potentially repair or replace the temperature sensors from outside the electrical machine housing.

This aspect of the invention may be particularly, but not exclusively, advantageous for obtaining a more efficient and optimal system, as the temperature sensors placed within an electrical machine is now accessible from the outside of the machine housing, as the sensors is inserted through an insertion bore and thereby no longer inaccessible and hidden inside the machine, but very easily to access.

Furthermore, the invention may also be particularly, but not exclusively, advantageous for obtaining a more reliable system, as the accessibility of the temperature sensors makes it possible to repair or replaced the sensors if any of the sensors shows any signs for not being functional. The sensors can without any trouble and any specific tools be taken out of the electrical machine and the corresponding machine housing and thereby being fixed outside the machine housing.

In a fourth aspect, the invention relates to a method for mounting a temperature sensor for monitoring of a stator winding temperature of an electrical machine from outside a machine housing around the stator, the method comprising:
- providing a temperature sensor with a sensor-end and a wire-end,
- providing an opening of the machine housing from an external surface of the housing and into a cooling slot of the stator windings,
- inserting an immersion sleeve into the opening of the electrical machine housing, into the cooling slot of the stator windings,
- mounting an insertion bore on an external surface of the electrical machine housing aligned with the opening of the electrical machine housing, and
- inserting the temperature sensor from outside the machine housing into the immersion sleeve via the insertion bore with an insertion angle of the temperature sensor through the machine housing (MH) perpendicular to or approximately perpendicular to an axis of rotation of the rotor (RO), so that the sensor-end is positioned in the cooling slot of the stator windings.

The first, second, third and fourth aspects of the present invention may each be combined with any of the other aspects. These and other aspects of the invention will be apparent from and elucidated with reference to the embodiments described hereinafter.

BRIEF DESCRIPTION OF THE FIGURES

The invention will now be described in more detail with regard to the accompanying figures of which

The figures show specific ways of implementing embodiments of the present invention and is not to be construed as being limiting to other possible embodiments falling within the scope of the attached claim set.

The temperature sensor device and method according to the invention will now be described in more detail with regard to the accompanying figures.

DETAILED DESCRIPTION OF AN EMBODIMENT

Figure 1:
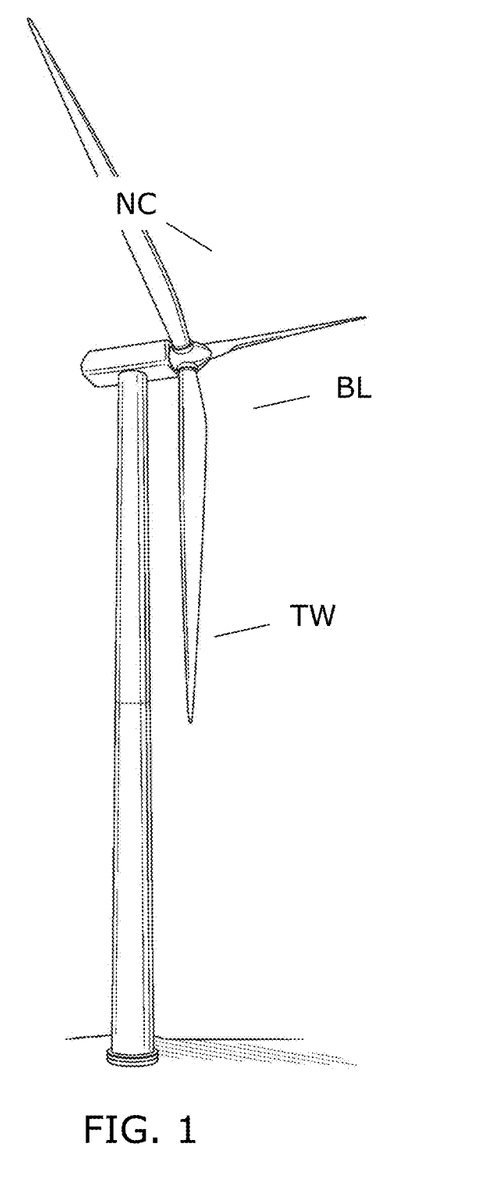
FIG. 1 illustrates a wind turbine in which the temperature sensing method and device is advantageously applied.

FIG. 1 shows a wind turbine WT with three rotor blades BL for driving a shaft of an electric power generator located inside the nacelle NC on top of a tower TW. The invention, i.e. the temperature sensing arrangement for an electric machine, is advantageous for use in such wind turbine WT, namely for providing a reliable and easily repairable temperature sensing system for stator windings of the electric power generator.

Figure 2:
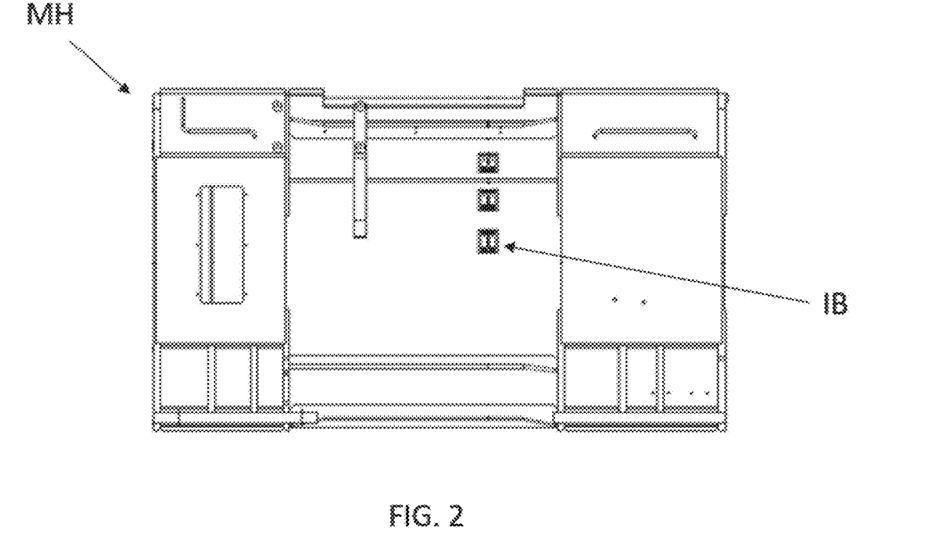
FIG. 2 illustrates an overview of a machine housing.

FIG. 2 shows an example of a machine housing, housing an electrical generator, where three insertion openings of the machine housing MH is provided with insertion bores IB. The insertion bores IB might be placed in any suitable location of the machine housing, e.g. to allow perpendicular insertion of the temperature sensor to reach the desired position in a cooling slot of the stator, perpendicular insertion direction is understood as being the same direction as radial to the rotor axis. The insertion opening allowing an at least one temperature sensor TS to be arranged for being replaced from the outside of the machine housing MH.

Figure 3:
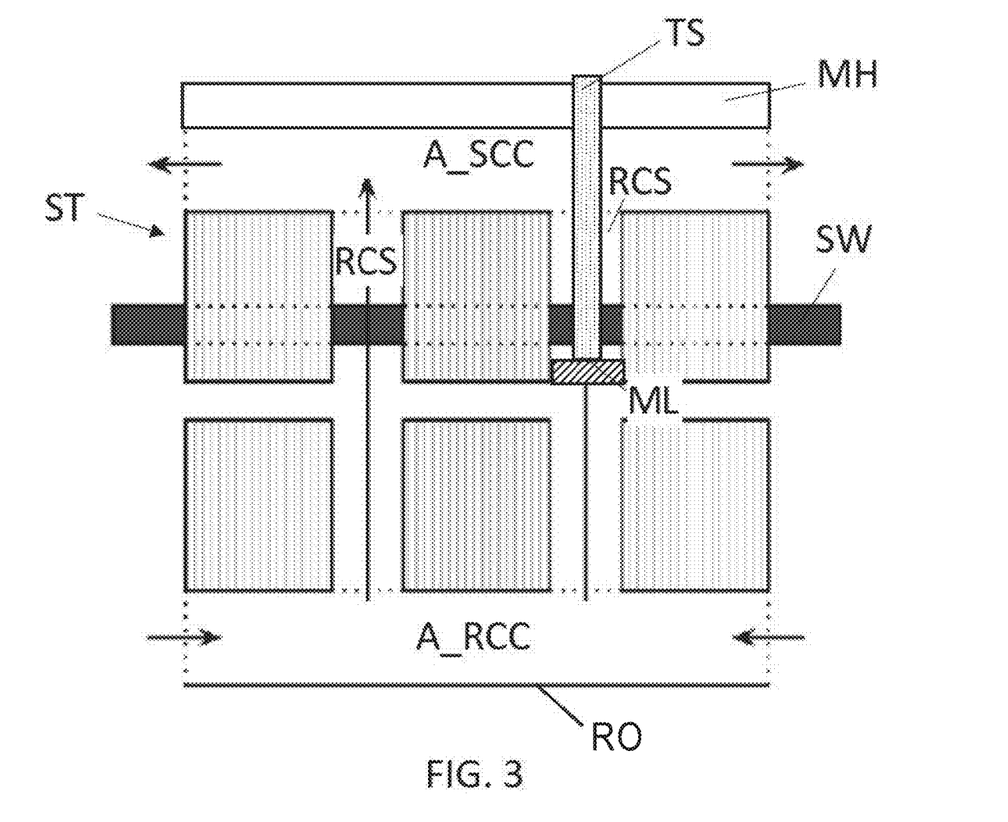
FIG. 3 illustrates a section of an electric machine with the temperature sensor positioned in a radial cooling slot of the stator.

FIG. 3 shows a section of an electric machine embodiment, e.g. an electric generator for a wind turbine, where the stator ST has radial cooling slots RCS between stacks of lamination sheets to cool the stator windings SW. The radial cooling slots RCS connect to an axial stator cooling channel A_SCC and an axial rotor cooling channels A_RCC for the rotor RO. The temperature sensor TS is shown to be positioned in one of these radial cooling slots RCS and having a length, so as to allow the sensor-end to be positioned at a bottom part of one of these radial cooling slots RCS nearest a center of the machine, while the wire-end is positioned outside the machine housing MH. It is further shown that an end of the cooling slot RCS nearest the center of the machine is blocked by a suitable material ML, so as to prevent the sensor-end of the temperature sensor TS to be cooled by cooling fluid, when positioned in the bottom part of the radial cooling slot RCS.

Figure 4:
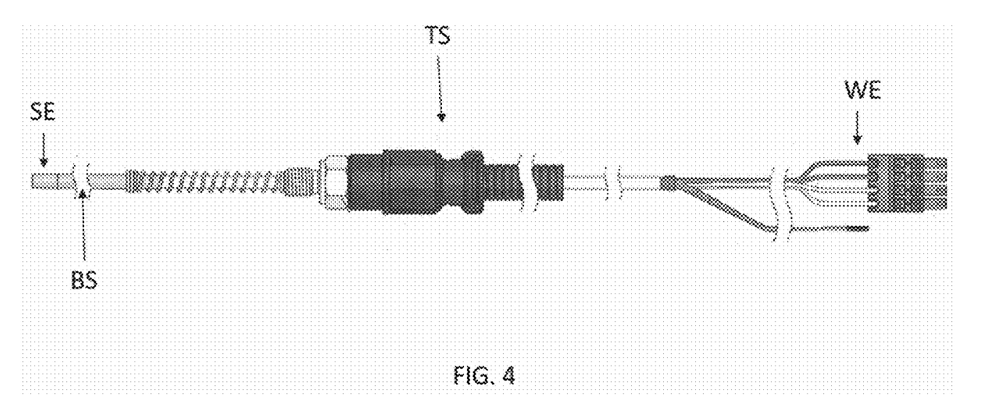
FIG. 4 illustrates a temperature sensor.

FIG. 4 shows an example of a temperature sensor TS with a sensor-end SE and a wire-end WE. The temperature sensor can potentially be length extended by the use of a bearing sensor BS. The temperature sensor TS is preferably a resistance temperature detector type sensor, e.g. such as a pt 100 sensor.

Figure 5:
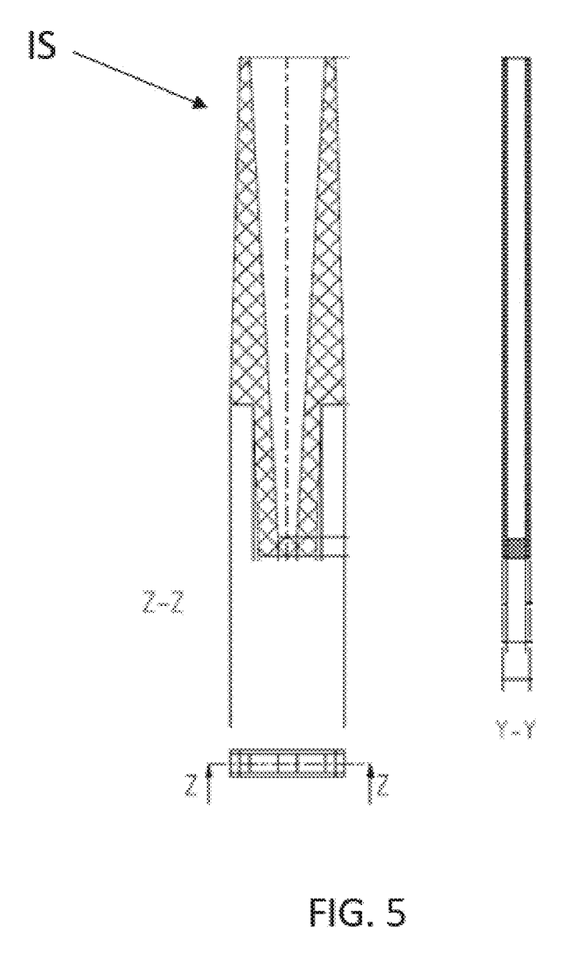
FIG. 5 illustrates two cross sections of an immersion sleeve.
Figure 6:
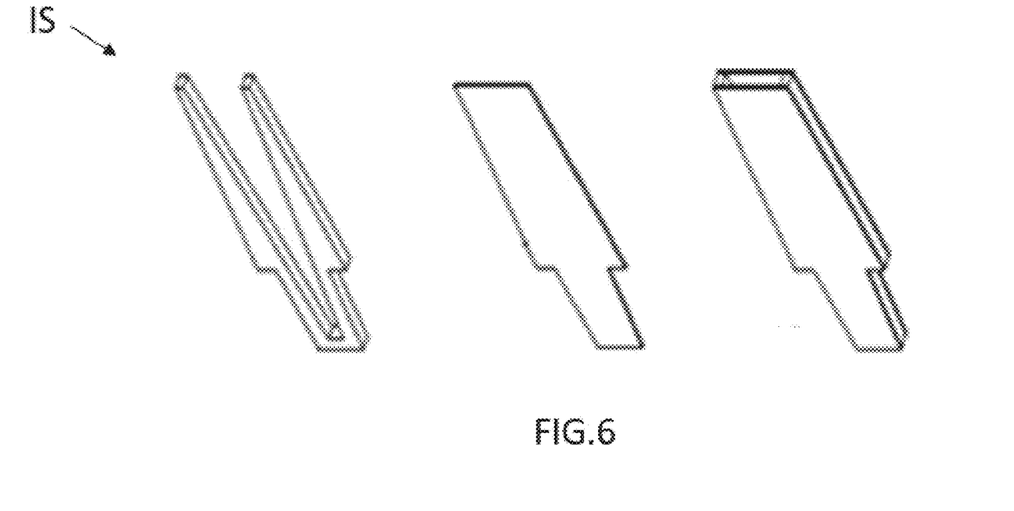
FIG. 6 illustrates two separate parts of an immersion sleeve and a collected immersion sleeve.

FIGS. 5 and 6 show an example of an immersion sleeve IS. FIG. 5 shows two cross sections of the immersion sleeve IS, and FIG. 6 shows two separate parts of the immersion sleeve (to the left) and an assembled immersion sleeve (to the right). The immersion sleeve IS is preferably made of a polymeric material.

Figure 7:
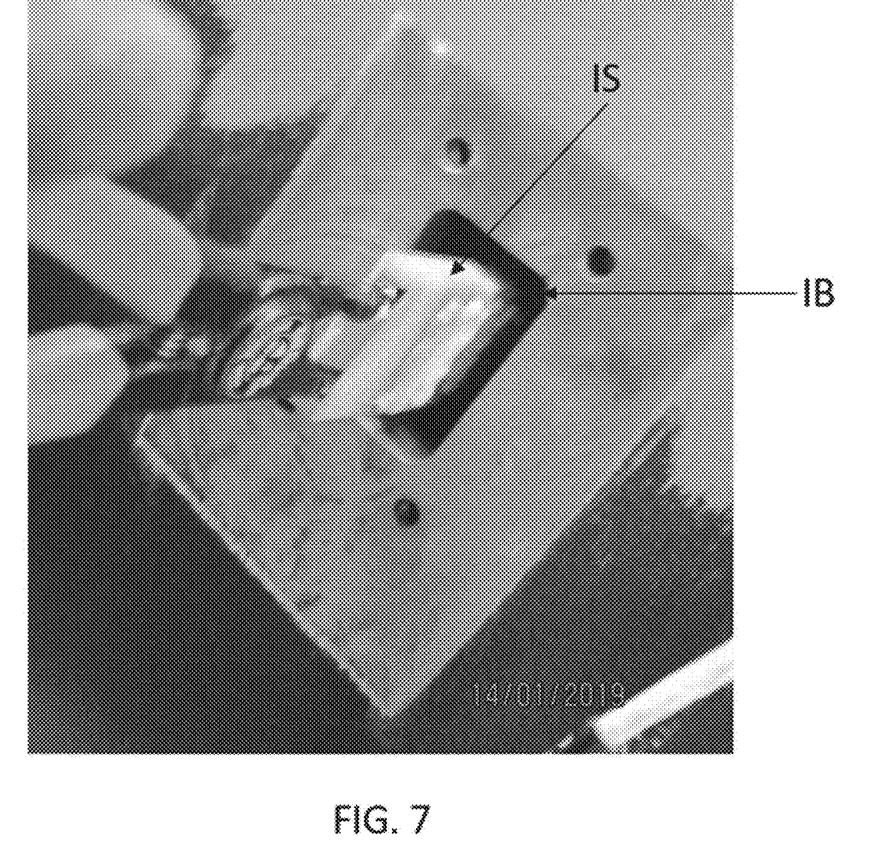
FIG. 7 illustrates an insertion of an immersions sleeve in an insertion bore.

FIG. 7 shows an insertion of an immersions sleeve IS in an insertion bore IB through a machine housing MH. The insertion bore IB having a suitable diameter for inserting the temperature sensor in the immersion sleeve IS. The insertion bore IB potentially being a bushing arranged in the opening of the machine housing. The immersion sleeve IS is in the figure illustrated as being glued into the bushing. It is important to use the radial cooling slot for the insert of the immersions sleeve. Making a bore in the stator lamination by mechanical tooling, will cause magnetic short circuits in the lamination, thus it is important to use radial openings in the stator lamination, such as the radial cooling slots.

Figure 8:
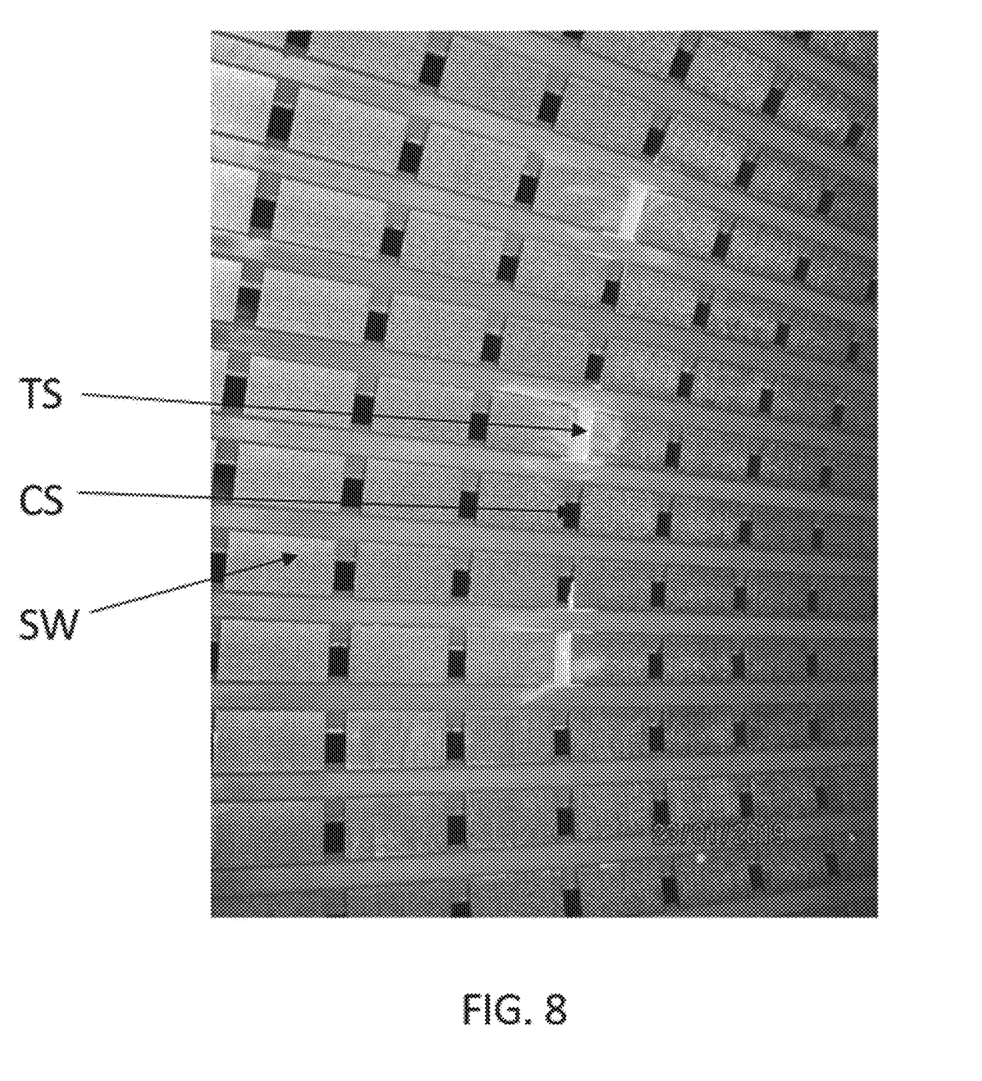
FIG. 8 illustrates the inside of a stator with a stator winding arrangement comprising stator windings with cooling slots.

FIG. 8 illustrates the inside of a stator with a stator winding arrangement comprising stator windings SW with cooling slots CS. Between the cooling slots CS is at least one, preferably a plurality of, temperature sensor TS arrangements arranged for sensing the temperature inside the stator windings, since the cooling slot CS temperature can be used as an indirect measure of temperature of the stator windings.

Figure 9:
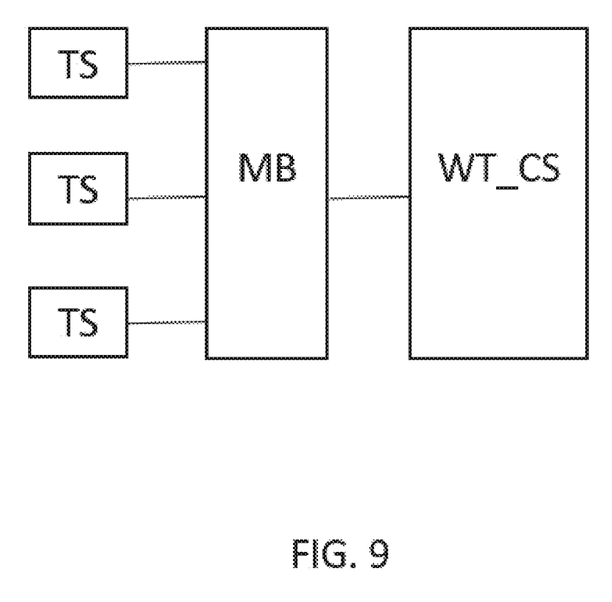
FIG. 9 illustrates the communication system of a sensed temperature.

FIG. 9 shows an embodiment with three temperature sensors TS and respective temperature sensor arrangements are connected to one single external terminal monitoring box MB. The monitoring box is connected to a wind turbine control system WT_CS, which controls the overall and general system of the wind turbine. The external terminal monitoring box MB is connectable at the wire-end of the temperature sensor TS, so as to allow an electric communication between the temperature sensor and the external monitoring box, and so as to allow monitoring of the temperature inside the stator windings SW from the outside of the machine housing MH. The wind turbine control system WT_CS can thus monitor temperature of the stator windings of the electric generator and generate an alarm or determine to shut-down in case predetermined temperature thresholds are exceeded. The wind turbine control system WT_CS may further generate an alarm that one of the temperature sensors TS is out of function and thus needs to be replaced or repaired.

Figure 10:
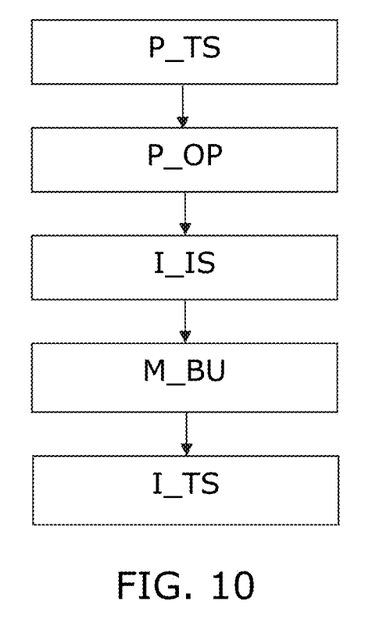
FIG. 10 illustrates steps of a flow-chart of a method according to the invention.

FIG. 10 illustrates steps of a flow-chart of a method according to the invention. The method for mounting a temperature sensor TS for monitoring of a stator winding SW temperature of an electrical machine EM from outside a machine housing MH around the stator ST, the method comprising:
  providing a temperature sensor P_TS with a sensor-end and a wire-end,
  providing an opening P_OP of the machine housing from an external surface of the housing and into a cooling slot CS of the stator windings,
  inserting an immersion sleeve I_IS into the opening of the electrical machine housing, into the cooling slot of the stator windings,
  mounting a bushing M_BU on an external surface of the electrical machine housing aligned with the opening of the electrical machine housing, and
  inserting the temperature sensor I_TS from outside the machine housing into the immersion sleeve via the bushing, so that the sensor-end is positioned in the cooling slot of the stator windings.

Thus, embodiments of the invention provide an electrical machine comprising a stator with a stator winding arrangement, a rotor arranged for rotation inside the stator, a machine housing for housing the stator, at least one temperature sensor arrangement and wherein a sensor-end of the temperature sensor is arranged for insertion into the immersion sleeve and for insertion through an insertion bore arranged in an opening in the machine housing, so that the sensor-end of the temperature sensor is positioned within a cooling slot of the stator windings, when inserted, so as to allow sensing of a temperature of measure of temperature of the stator windings by electric connection to the wire-end of the temperature sensor.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. A system comprising;
  a stator with a stator winding arrangement comprising stator windings, a first stack of lamination sheets, a second stack of lamination sheets, and a cooling slot positioned between the first stack of lamination sheets and the second stack of lamination sheets;
  a rotor arranged for rotation inside the stator;
  a machine housing for housing the stator; and
  at least one temperature sensor arrangement comprising:
    a temperature sensor with a sensor-end and a wire-end; and
    an immersion sleeve;
  wherein an insertion angle of the temperature sensor arrangement through the machine housing is perpendicular to or approximately perpendicular to an axis of rotation of the rotor; and
  wherein the sensor-end of the temperature sensor is arranged for insertion into the immersion sleeve and for insertion through an insertion bore in the machine housing, so that the sensor-end of the temperature sensor is positioned within the cooling slot between the first stack of lamination sheets and the second stack of lamination sheets, so as to allow sensing of a temperature of the stator windings by electric connection to the wire-end of the temperature sensor.

2. The system according to claim 1, comprising an external terminal monitoring box connectable at the wire-end of the temperature sensor, so as to allow an electric communication between the temperature sensor and the external terminal monitoring box, and so as to allow monitoring of the temperature inside the stator windings from outside of the machine housing.

3. The system according to claim 1, wherein the at least one temperature sensor arrangement is arranged for the temperature sensor being replaced from the outside of the machine housing.

4. The system according to claim 1, comprising a plurality of temperature sensor arrangements arranged for insertion into respective openings of the machine housing.

5. The system according to claim 1, wherein a plurality of temperature sensors or respective temperature sensor arrangements are connected to one single external terminal monitoring box.

6. The system according to claim 1, wherein the temperature sensor is a resistance temperature detector type sensor.

7. The system according to claim 1, wherein the immersion sleeve is made of a polymeric material.

8. The system according to claim 1, wherein the immersion sleeve is glued into an opening of the machine housing.

9. The system according to claim 1, wherein the temperature sensor has a length, so as to allow the sensor-end to be positioned at a bottom part of the cooling slot nearest a center of the machine, while the wire-end is positioned outside the machine housing.

10. The system according to claim 9, wherein an end of the cooling slot nearest the center of the machine is blocked by a suitable material, so as to prevent the sensor-end to be cooled by cooling fluid, when positioned in the bottom part of the cooling slot.

11. The system according to claim 1, wherein the stator and the rotor are arranged to produce an electric power of at least 1 MW.

12. A wind turbine comprising an electrical generator, the generator comprising;
a stator with a stator winding arrangement comprising stator windings, a first stack of lamination sheets, a second stack of lamination sheets, and a cooling slot positioned between the first stack of lamination sheets and the second stack of lamination sheets;
a rotor arranged for rotation inside the stator, wherein one or more blades of the wind turbine is connected to rotate the rotor of the generator for generation of electric energy;
a generator housing for housing the stator; and
at least one temperature sensor arrangement comprising:
a temperature sensor with a sensor-end and a wire-end; and
an immersion sleeve;
wherein an insertion angle of the temperature sensor is arranged for insertion through the generator housing perpendicular to or approximately perpendicular to an axis of rotation of the rotor; and
wherein the sensor-end of the temperature sensor is arranged for insertion into the immersion sleeve and for insertion through an insertion bore in the generator housing, so that the sensor-end of the temperature sensor is positioned within the cooling slot between the first stack of lamination sheets and the second stack of lamination sheets so as to allow sensing of a temperature of the stator windings by electric connection to the wire-end of the temperature sensor.

13. A method for mounting a temperature sensor for monitoring of a stator winding temperature of an electrical machine from outside a machine housing around a stator, the method comprising:
providing a temperature sensor with a sensor-end and a wire-end;
providing an opening of the machine housing from an external surface of the machine housing and into a cooling slot of the stator windings, wherein the cooling slot is positioned between a first stack of lamination sheets of the stator and a second stack of lamination sheets of the stator;
inserting an immersion sleeve into the opening of the electrical machine housing, into the cooling slot of the stator windings;
mounting a bushing on an external surface of the electrical machine housing aligned with the opening of the electrical machine housing; and
inserting the temperature sensor from outside the machine housing into the immersion sleeve via the bushing with an insertion angle of the temperature sensor through the machine housing perpendicular to or approximately perpendicular to an axis of rotation of a rotor, so that the sensor-end is positioned in the cooling slot of the stator windings.

* * * * *